US010443171B2

United States Patent
Schmidt et al.

(10) Patent No.: US 10,443,171 B2
(45) Date of Patent: Oct. 15, 2019

(54) METHOD AND CONTAINER FOR VERFYING WHETHER ALL FRAGMENTS OF A BROKEN NEEDLE ARE PRESENT

(71) Applicant: Groz-Becket KG, Albstadt (DE)

(72) Inventors: Reiner Schmidt, Albstadt (DE); Stanley Tarique Gunasekera, Albstadt (DE)

(73) Assignee: Groz-Beckert KG, Albstadt (DE)

( * ) Notice: Subject to any disclaimer, the term of this patent is extended or adjusted under 35 U.S.C. 154(b) by 713 days.

(21) Appl. No.: 14/429,823

(22) PCT Filed: Sep. 23, 2013

(86) PCT No.: PCT/EP2013/069733
§ 371 (c)(1),
(2) Date: Mar. 20, 2015

(87) PCT Pub. No.: WO2014/044847
PCT Pub. Date: Mar. 27, 2014

(65) Prior Publication Data
US 2015/0252505 A1    Sep. 10, 2015

(30) Foreign Application Priority Data

Sep. 21, 2012  (EP) .................................... 12185390

(51) Int. Cl.
*D05B 83/00* (2006.01)
*D05B 91/12* (2006.01)
(Continued)

(52) U.S. Cl.
CPC ............. *D05B 83/00* (2013.01); *D05B 91/12* (2013.01); *F16P 1/00* (2013.01);
(Continued)

(58) Field of Classification Search
CPC ......... D05B 83/00; D05B 91/12; B65D 83/02
(Continued)

(56) References Cited

U.S. PATENT DOCUMENTS

| 1,547,846 | A | * | 7/1925 | Tonnesen | ............... | A47B 29/00 |
| | | | | | | 223/107 |
| 2,888,136 | A | * | 5/1959 | La Borde | ............... | D05B 91/12 |
| | | | | | | 206/350 |

(Continued)

FOREIGN PATENT DOCUMENTS

| CN | 2034181 U | 3/1989 |
| CN | 102051799 A | 5/2011 |

(Continued)

OTHER PUBLICATIONS

International Search Report for corresponding PCT application No. PCT/EP2013/069733, dated Mar. 1, 2014, 3 pages.

(Continued)

*Primary Examiner* — Nathan E Durham
(74) *Attorney, Agent, or Firm* — Fitch, Even, Tabin & Flannery LLP (57) ABSTRACT

Quality assurance in sewing a textile sewn sequentially in a plurality of workstations (11) can be provided using a carriage 14 that can be moved between the workstations (11). Should a needle (12) break off in a workstation (11), the carriage (14) is moved to this workstation (11). The fragments (13) of the needle (12) are arranged in the container (20) and once it has been established that all the fragments (13) have been removed from the workstation (11) a replacement needle is provided for this workstation. The container (20) has an accommodation space (21) delimited by a main body (22) and a lid (23). A retaining magnet (34) is arranged (Continued)

in the region of a base (32) of the main body (22) extending along one axis (A) to retain magnetizable fragments (13) of a needle (12).

14 Claims, 5 Drawing Sheets

(51) Int. Cl.
*F16P 1/00* (2006.01)
*A47B 31/00* (2006.01)

(52) U.S. Cl.
CPC .... *A47B 2031/003* (2013.01); *D05D 2207/06* (2013.01); *D05D 2305/50* (2013.01)

(58) Field of Classification Search
USPC .......... 206/350, 380; 223/107, 109 A, 109 R
See application file for complete search history.

(56) References Cited

U.S. PATENT DOCUMENTS

| | | |
|---|---|---|
| 3,896,749 A | 7/1975 | Brauns |
| 3,982,631 A | 9/1976 | Kunik et al. |
| 4,116,333 A * | 9/1978 | Pavel .................... B65D 85/24 206/380 |
| 4,553,687 A | 11/1985 | Harkins |
| 4,664,302 A | 5/1987 | Dalbo |
| 4,679,716 A * | 7/1987 | Layton .................. A41H 31/00 206/338 |
| 4,796,780 A | 1/1989 | Huang |
| 5,918,559 A * | 7/1999 | Sakino .................. D05B 83/00 112/235 |
| 2006/0076744 A1 | 4/2006 | Martin |
| 2011/0068562 A1 | 3/2011 | Keffeler et al. |

FOREIGN PATENT DOCUMENTS

| | | |
|---|---|---|
| CN | 202175846 U | 3/2012 |
| FR | 2176339 A5 | 10/1973 |
| FR | 2557438 | 7/1985 |
| GB | 649678 A | 1/1951 |
| GB | 805628 A | 12/1958 |
| GB | 1362738 A | 8/1974 |
| IT | 1225589 B | 11/1990 |
| JP | H07185176 A | 7/1995 |

OTHER PUBLICATIONS

Office action and search report in corresponding Chinese application No. 201380060960.0, dated Mar. 31, 2016, 15 pages.
Second office action and search report in corresponding Chinese application No. 201380060960.0, dated Sep. 18, 2016, 14 pages.
Partial search report in corresponding European application No. 12 18 5390, dated Mar. 14, 2013, 3 pages.
Search report and written opinion in corresponding European application No. 12 18 5390, dated Jul. 16, 2013, 10 pages.
Indonesian Office Action dated Apr. 3, 2018, for Indonesian Application No. P-00201501615, with English Machine Translation (4 pgs.).
Indian Office Action dated May 27, 2019, in corresponding Indian Patent Application No. 723/KOLNP/2015, with English translation (7pgs.).

* cited by examiner

METHOD AND CONTAINER FOR VERFYING WHETHER ALL FRAGMENTS OF A BROKEN NEEDLE ARE PRESENT

CROSS REFERENCE TO RELATED APPLICATIONS

This patent application is the national phase of PCT/EP2013/069733 filed Sep. 23, 2013, which claims the benefit of European Patent Application No. 12185390.7 filed Sep. 21, 2012.

TECHNICAL FIELD

The present invention relates to a method for verifying whether all fragments of a broken needle are present in a container, and to a container for performing this method as well as to the use of this container in a carriage.

BACKGROUND

Methods for quality assurance in the sewing of a textile part, for example, an item of clothing, have been known. In particular, the invention relates to a method for verifying whether all fragments of a broken needle are present in a container that is to be used for performing the method according to the invention. Furthermore, the invention relates to a carriage that allows the needle replacement of a damaged, worn or broken needle with a replacement needle in the fastest possible and least complicated way. In addition to the container, the carriage usually contains other utensils that are disposed to simplify the method.

When textile parts are sewn, a textile workpiece moves successively through several work stations and is finished step by step. The manufacturing process is interrupted when an error occurs at a work station, for example, if a sewing needle breaks. The sewing operation to be performed at this work station cannot be continued. Inasmuch as the upstream work stations continue to operate in an error-free manner, the textile workpieces will cause a jam at the work station affected by the needle breakage. Conversely, the downstream work stations do not receive further workpieces and, ultimately, they can no longer continue to work.

In the event of a needle breakage at a work station it must be ensured that all fragments of the needle were found and that no fragment remains in the textile workpiece and thus in the textile that is to be produced. If fragments remain in the affected textile part, there is the risk that a future wearer of the textile part is injured (image damage, product liability).

SUMMARY

The verification whether all needle pieces have been found takes up time and stops the manufacturing process. For this reason, the object of the invention may be viewed to be the improvement of quality assurance during the sewing process and, in particular, the removal of all fragments of the broken needle from the affected work stations or the replacement of a damaged needle as soon as possible in order to be able to smoothly resume the manufacturing process.

In accordance with the invention, the method for verifying (verification method) whether all fragments of a broken needle, in particular a machine sewing needle, are present in a container is performed in that the fragments of the broken needle are arranged in an aligned manner by means of a retaining magnet in the accommodation space in a container delimited by a main body and a lid of the accommodation space of the container. The arrangement is accomplished in such a manner that the original shape of the broken needle is reproduced (reconstructed as accurately as possible) from the fragments. The accommodation space and the holding magnet are designed in such a manner that this can be accomplished in an uncomplicated manner.

Before making the replacement sewing needle available to the work station, e.g., with the use of the container, it is verified whether the replaced needle is complete and that no fragments have been left in the work station or in the workpiece; only when this has been confirmed, the replacement sewing needle will subsequently be released for the work station (11).

As soon as—with the use of the container—it has been ensured that all the fragments of the needle are present in the container, a replacement needle for the work station will be released. Otherwise, it will be documented that not all fragments have been found; this will be after an extended search that follows an exactly prespecified plan, e.g., providing that the textile part is to be examined for needle fragments in a special detector space. It is only thereafter that the search is finally stopped and sewing work is resumed.

Preferably, only the fragments of a single needle are arranged in each container.

The container for storing fragments of a needle, in particular a machine sewing needle, preferably comprises a main body as well as a lid, these delimiting an accommodation space, and comprises a retaining magnet provided on the main body, the magnetic field of said magnet being disposed for retaining fragments along the axis.

The retaining magnet, usually a permanent magnet, extends preferably along an axis, for example along a center axis of the accommodation space, on the base of the main body. Thus, the fragments can be arranged very easily along the axis in the accommodation space.

Preferably, the retaining magnet is arranged in a groove of the main body. Preferably, the groove extends along the axis and is open in particular toward the accommodation space. Thus, the upper side of the retaining magnet associated with the accommodation space adjoins the base surface of the main body, said base surface facing the accommodation space. The upper side of the magnet and the base surface of the main body may—but need not necessarily—be adjacent each other without steps or edges. For example, the retaining magnet may be glued into the groove.

In a preferred exemplary embodiment the base surface of the main body is inclined toward the groove or toward the retaining magnet. Extending from the two lateral edges of the base surface parallel to the axis, said base surface is inclined downward toward the retaining magnet. A fragment placed in the accommodation space thus slides automatically toward the retaining magnet along the inclined base surface and is securely held there by the magnetic field.

At least one abutment surface may be provided in one area of the accommodation space, said abutment surface preferably being oriented at a right angle to the upper side of the retaining magnet facing the accommodation space or at a right angle to the axis. Preferably, the abutment surface is provided on one axial end of the retaining magnet. The fragments of the needle can be arranged in an ordered manner starting from the abutment surface along the axis, in which case it is easier to see whether all fragments could be found.

The strength of the retaining magnet that is a function of the specific properties and the maximum magnetic energy density, and the geometry (size) of the magnet is selected such that the needle fragments retained on the retaining magnet are held securely even if the container falls down. The container typically falls from a table height (height: 0.5 to 1 meter) or hand height (0.8 to 1.2 meters). Therefore, in the normal case falling heights of more than 1.5 meters are not to be expected. In order to ensure that the needle fragments are securely retained up to falling heights of at most 1.5 meters by the installed magnet, preferably strong magnets are used (magnets having large dimensions and a high magnetic energy density, e.g., magnets that consist of alloys such as samarium-cobalt ($SmCO_5$: maximum magnetic energy density $(BH)_{max}$=130-200 kJ/m³; $Sm_2CO_{17}$: $(BH)_{max}$=160-260 kJ/m³; or neodymium-iron-boron ($Nd_2Fe_{14}B$:$(BH)_{max}$~512 kJ/m³). The use of a permanent magnet of aluminum-nickel-cobalt alloys or of ferrites is also conceivable.

On the other hand, the needle fragments must adhere to the retaining magnet only firmly enough that the original form of the needle can be reconstructed with the fragments. For reconstruction, usually the needle fragments are applied to the retaining magnet in their approximate position on the retaining magnet and subsequently slid into their exact position. In order to make this possible the friction (adhesive friction) between the fragments arranged on the retaining magnet and the retaining magnet may at most be such that the fragments can be easily shifted, i.e., without significant use of force, on the surface of the retaining magnet. In particular, the fragments must not detach from the retaining magnet while they are being shifted.

In order to achieve that the fragments securely adhere to the retaining magnet even if the container falls down, and, on the other hand, that the fragments can be shifted without complication on the surface of the retaining magnet, comparably strong retaining magnets are used. At the same time, the surface of at least that side of the retaining magnet on which the needle fragments are arranged, must be of a quality that the coefficients of friction (adhesive friction coefficient and sliding friction coefficient) between the affected surface and the needle fragments are comparatively low.

The required low coefficients of friction can be achieved in that retaining magnets are used comprising low surface roughness in the affected areas. In order to be able to attain an appropriately low surface roughness, the surfaces of the retaining magnet can be smoothed, e.g., by grinding or polishing. Additionally or alternatively, the affected surfaces may be covered with a material, e.g., PTFE or other plastic material, that exhibits good sliding properties relative to the material of the needle fragments, i.e., usually relative to steel.

The covering of the surface of the retaining magnet where the needle fragments are arranged my be achieved by a coating method, by the application, e.g., of a thin plate/foil, or by a complete enclosure of the retaining magnet, e.g., by installing it in a housing. Furthermore, it is conceivable to provide the affected surfaces with a sliding agent such as, e.g., an oil.

Adhesive friction coefficients of steel on steel are stated as 0.15 to 0.5 and of steel on PTFE as 0.04 to 0.11. No adhesive friction coefficients of steel on samarium-cobalt magnets or neodymium-iron-boron magnets are known from literature. However, assuming that the adhesive friction coefficients of steel on samarium-cobalt magnets or neodymium-iron-boron magnets approaches those of steel on steel (see above), steel on grey iron (0.19) or steel on bronze (0.19), maximum values of the adhesive friction coefficients with the use of uncoated retaining magnets, between the surface of the magnet and the needle fragments of at most 0.2, preferably at most 0.15, are to be attempted. In the case of magnets that are provided with a cover layer, it is possible, as illustrated above, to achieve generally substantially lower adhesive friction coefficients in conjunction with needle fragments. Accordingly, considering these magnets, adhesive friction coefficients lower than 0.1, preferably lower than 0.05, are to be attempted.

If a magnet provided with a cover layer is used, this must be taken into account when the (strength) of the magnet is selected. Because of the cover layer, the fragments are at a distance from the magnet, as a result of which the magnetic force acting on the fragments is smaller than if the fragments were located directly on the surface of the retaining magnet.

Provided in the accommodation space there may be at least one display, for example, a metering scale and/or a graphic illustration of the needle (i.e., true-to-scale illustration of the needle used at the respective work station). The display is disposed for verifying whether all fragments of the needle are in the container. Usually, the metering scale shows the total length of the needle used at the work station. Preferably, the needle types that are frequently used at the work station are shown. The display may also be present or be applied to the upper side of the retaining magnet and/or to the base surface of the main body. The displays are disposed for measuring the length of the found fragments or for comparison with the original shape of the needle, and thus simplify the decision whether all the fragments of the needle have been found. In particular, the display may start directly at the abutment surface, i.e., it may directly adjoin the abutment surface in the direction of the axis. Then the fragments can be placed next to each other in an ordered manner, for example starting from the abutment surface; thus it can be quickly detected whether the total length of the assembled fragments corresponds to the total length of the needle. This further facilitates and accelerates the verification whether the broken sewing needle could be completely removed from the textile workpiece.

The lid of the container can be supported so as to be movable, for example, pivotable or slidable, on the main body. Preferably, the lid can be moved between an open position and a closed position. Preferably, the lid of the container is supported so as to be movable between a closed position and an open position, for example, in a slidable or pivotable manner on the main body. Furthermore, holding means may be provided for holding the lid in its closed position on the main body. The holding means may be engagement means or other means, in which case in particular a positive and/or nonpositive connection is produced between a snap-in projection or snap-in nub on the lid or on the main body and a snap-in recess on the respective container part in the closed position of the lid. Considering a cost-effective modification, the lid of the container can be taken off; however, when the lid is closed, it is held securely in the closed position by a holding means described hereinabove.

In a preferred embodiment, the lid may at least in part consist or a transparent material. For example, it may be completely transparent of comprise at least one transparent viewing window, so that a look into the accommodation space is possible in the closed position of the lid. A magnifying lens part may be provided on this viewing window or in the transparent part. The magnifying lens part is preferably arranged on the lid in such a manner that said magnifying lens part is located in the region above the retaining magnet when the lid is in closed position. By means of the magnifying lens part it is possible to more clearly see the fragments of the needle, so that—in particular by inspection of the fragments—it can be assessed whether two fragments of the needle are directly adjacent each other or not.

It is also possible to arrange a battery-fed light source in the accommodation space of the container in order to have sufficient light for viewing the fragments. A switch that is accessible with the lid closed can be used for switching the light source on and off. A container as described hereinabove is in particular suitable for use with the inventive method for quality assurance (quality assurance process) when a textile part is being sewn. In doing so, one or more inventive containers may be present in the carriage that can be moved between the work stations and/or at each work station where sewing takes place.

The use of the container in accordance with the invention has the advantage—compared with the method used until now, wherein needle fragments are compared with the rough drawing of the needle and subsequently glued by means of a transparent adhesive tape to a form used for documentation—that the original form of the needle can be duplicated in a less complicated and faster manner with needle fragments. This is because, with the use of the inventive container (different from the so far used method), the needle fragments can be shifted simply on the retaining magnet in order to reconstruct the original needle form. In this manner, it is possible, at the same time, to shorten process down times and to reduce the probability that any missing of fragments is not noticed.

As a follow-up to this, documentation sheets that are completed during the process, and special receptacles (bags) for the needle fragments, i.e., usually self-adhesive needle letters, facilitate the storage of the needle fragments in a prespecified storage whose content must also be documented.

In a preferred modification, the needle letters that are used consist of a main section that comprises a bag for receiving the needle fragments and of a tab section connected to the main section, said tab section being disposed for sealing the bag. Preferably, the main section and the tab section are made of an interconnected, e.g., rectangular, piece of foil, e.g., of plastic material or paper.

Preferably, the bag (in conjunction with the main section) is made of an additional piece of foil (attachment foil) that is material-bonded to the main section, e.g., by means of welding or adhesion. Preferably, the attachment foil is completely bonded on the three sides facing away from the tab section i.e., on all the sides with the exception of the side facing the tab section, as a result of which a bag is formed that is open (only) on the side facing the tab section (i.e., has an opening).

In order to later facilitate a visual inspection of the needle fragments in the bag, at least the attachment foil may consist of a transparent material, e.g., a transparent plastic material. Preferably, the main section, the tab section and/or the attachment film consist of a transparent material, e.g., a transparent plastic material.

Advantageously, the tab section is provided with a first adhesive area that is disposed for sealing the bag and is preferably located on the same side (surface) of the needle letter where the attachment foil is fastened. In order to close the bag, usually the tab section is folded over, e.g., by bending along a connecting line extending between the main section and the tab section, and—in its folded-over position, i.e., folded over by approximately 180°—connected (glued) by means of the adhesive surface to the attachment foil and/or to the main section. As an alternative to sealing the bag, however, positive-interlocking connections, i.e., insertion of a tab, are also conceivable.

In addition, the main section may be provided with a second adhesive area that is used for gluing the needle letter to a documentation sheet. The second adhesive area is preferably provided on the side (surface) of the needle letter located opposite the side where the attachment foil is located. The first, as well as the second, adhesive surfaces may be provided with a protective foil in the manner of an adhesive labels that need to be peeled off before use of the respective adhesive area.

Preferably, the needle letters are produced in the form of a needle letter sheet that comprises several/a plurality of needle letters. To accomplish this, e.g., several superimposed transparent plastic films that are provided with sections of adhesive areas (in the form of labels) can be welded together in given areas, as a result of which the respective bags are formed. The needle letters are either cut out of the needle letter sheets, or the needle letter sheets are produced in such a manner (e.g., provided with perforations or thinned lines) that the individual needle letters can be separated from each other.

After the needle fragments have been placed in the bag of a needle letter, the bag is closed by means of the tab section and subsequently glued—preferably by means of the second adhesive area—to a documentation sheet (e.g., of paper or cardboard) in such a manner that the attachment foil faces upward. If the attachment foil is transparent (consists of a transparent material), the needle fragments can be inspected without opening the bag. In addition to several areas that are provided for gluing on the needle letters and that are arranged, e.g., in columns relative to each other, the documentation sheet comprises additional, e.g., arranged in columns, documentation fields in which, e.g., the date, the time, the relevant work station (machine), the production line, the person (operator) working at the work station, and the part number of the broken needle can be entered.

Furthermore, the use of a carriage that can be moved between the work stations is provided, said carriage being equipped with at least one inventive container, i.e., said carriage comprising at least one container for storing fragments of a needle.

Advantageously, the carriage is used for a method ensuring quality (quality assurance method) in sewing a textile part, said method comprising several work stations at which one sewing operation is performed, respectively, wherein a textile part passes through the work stations in a prespecified sequence. In the case of needle breakage, the carriage that can be moved between the work stations picks up the fragments of a broken needle at a work station and provides a replacement sewing needle for the (affected) work station.

Specifically, in the case of a needle breakage or a damage of the needle at a work station, the person working at the work station will immediately trigger an alarm. From a central location (needle dispensing site), the carriage is immediately run to the affected work station. The carriage is disposed for receiving the damaged needle or the fragments of the damaged needle and, at the same time, makes available a replacement needle for the work station. The person working at the work station is not forced—as has been usual until now—to leave the work station and exchange, at a central location, the damaged or broken sewing needle for a replacement needle. This procedure implies the risk that the person working at the work station accidentally carries away or loses on her way needle fragments that may be, e.g., on the person's clothing. Such needle fragments can virtually no longer be found. In contrast, when using a carriage according to the invention, the needle replacement takes place directly at the affected work station, thus saving unnecessary moving around and further reducing the time that the manufacturing process is interrupted. In addition, there is no longer the risk that needle fragments are carried away from the work station and lost along the way.

Preferably, the carriage comprises a work surface on which the inventive container can be arranged and where it can be verified on-site whether all fragments are present. As soon as all fragments have been found, these are removed from the container and placed in a bag (or similar receptacle), e.g., in the form of a self-adhesive needle letter. Subsequently, the bag is sealed, e.g., glued closed. The bag with the fragments is stored in a third storage region of the carriage. For safety reasons, the bag is designed in such a manner that it can no longer be opened in a non-destructive manner after it has been sealed.

Advantageously, the storage space for the replacement needles and/or the storage space for used and unbroken needles is a container that can be closed and is arranged in the interior of the carriage.

Considering an exemplary embodiment of the carriage in accordance with the invention, said carriage comprises an interior space with three separate storage spaces. New replacement sewing needles for needle replacement are stored in a first storage space, which, for example, may be a lockable drawer. Used, bent, worn or otherwise damaged, but unbroken, needles are stored in a second storage space that may be, for example, a lockable accommodation container. A third storage space is disposed for the storage of broken needles and for the uninterrupted documentation of the presence of the broken needle or of its individual needle fragments. Due to the strict separation of the storage spaces, an inadvertent mixing of needles is avoided.

Advantageously, the separation of the spaces for new and for used, unbroken needles is implemented by latchable or lockable drawers. As a result of this, the access to the respective spaces is facilitated, this potentially being made more difficult, e.g., by a door (mounted in the front region of the carriage). At the same time, the drawers that can be pulled out facilitate access to the needles and the work means, and thus reduce the work times required for an exchange of needles. Consequently, down times (during running production) caused by the replacement of needles are minimized.

Preferably, a duct, a shaft or the like that may, e.g., be a tube, may terminate on the work surface, said tube being connected to the storage space or to a storage container for used, unbroken needles. Unbroken, used needles can be thrown in there and be transported, via the shaft, into the second storage space for used, unbroken needles. For example, the shaft or duct may terminate in a storage container for used, unbroken needles.

In another exemplary embodiment, in which the shaft is omitted, the second storage space is implemented by a lockable storage container having a drop slot. The drop slot should not exceed the dimensions of 50 mm×5 mm in order to ensure that the needles will not inadvertently fall out, in case the container is tipped over.

Preferably, the storage container has dimensions of at most 25×25×25 cm in order to avoid accidents due to the fact that the maximum weight increases increasing volume of the content, and to thus reduce the risk that, during the (difficult to perform) emptying process, needles leave the secured cycle of the procedure.

Furthermore, the storage container is preferably positioned on a non-slip support or in a fixation means in order to prevent a slipping or even tipping-over of the storage container while the carriage is moving.

In addition, the storage container is preferably transparent which, in particular, allows an impending emptying to be integrated in the work process in a timely manner. Also, injuries are avoided that can be caused when attempts are made to put needles through the slot when the container is full. Injuries can be caused in the case when—as needles are being inserted in a full storage container—the respective needle unexpectedly strikes needles already present in the storage container and, as a result of this, a mechanical resistance occurs.

It is intended that access occurs either to the first storage space for new needles or to the second storage space for used, unbroken needles via a switching device, usually implemented as a movable door or as drawers. In both cases, it is advantageous to provide a locking mechanism that, at the same time, prevents any access to the two storage spaces. An inadvertent mix-up or confusion of replacement sewing needles with used, unbroken needles is thus prevented. For example, the switching device may be a sliding door and clear either the access to the first storage space or to the second storage space and lock the respectively other storage space.

Accordingly, the carriage comprises a switching device, e.g., a door, that can be moved between two positions, in which case the switching device (door) allows, in one position, the access to the storage space for replacement sewing needles and prevents the access to the storage space for used unbroken needles and, in the other position, prevents the access to the storage space for replacement sewing needles and allows the access to the storage space for used, unbroken needles.

The carriage may be equipped with tools such as, e.g., a magnetic broom and/or a magnetic pin, that is provided with a strong magnet that attracts fragments of needles (usually ferromagnetic fragments) as soon as the respective magnet is brought into the vicinity of the fragments. Thus, the search for needle fragments can be considerably simplified.

Usually, the magnetic broom consists of a rod-shaped magnet having on its faces respectively one wheel and a handle. The magnet may be colored (black, e.g.), thus creating a great contrast relative to the metallic needle fragments. In order to find needle fragments, the magnetic brush is rolled with the use of the handle over the floor or other plane areas where needle fragments could be found, in which case the rod-shaped magnet is guided across the floor at a relatively small distance therefrom. Needle fragments that are on the floor are attracted by the magnet and can be found there in an uncomplicated manner due to the high color contrast (compared to the magnet).

In a preferred exemplary embodiment, a miniature magnetic broom can be used, said broom being able to pick up needle splinters that potentially adhere to the carriage during cleaning operations.

Usually, the magnetic pin consists of a rod where a magnet is arranged on one of its ends. The magnet is guided over those areas where needle fragments could be present that, however, are not accessible to the magnetic broom such as, e.g., in regions inside of machines, regions of textile workpieces or regions inside the carriage (e.g., in corners of drawer inserts).

The entire interior of the carriage, as well as the work surface, may be covered with a black, usually non-slip and soft cover. The black color mainly acts to be able to simply detect the small (silver-colored) fragments of the needles on the surface. Furthermore, the soft surface is to prevent that needle parts that potentially fall down bounce up and are then difficult to find. The work surface is preferably provided by a peripheral edge that has a height of, e.g., at least 0.5 cm. It is disposed to prevent needle parts from falling down.

The overall dimensions of the carriage, as well as the functionality of the rollers, are usually adapted to the situations existing in a sewing business. Preferably, the carriage has two fixed front rollers and 2 movable rear rollers to allow a precise negotiation—without, however, making it possible for the carriage to tip over due to its usually very top-heaving load.

The location of the access on the carriage to the storage spaces (access to the content of the carriage) depends on the side of the work stations (of the machines in the production lines) where the carriage is used and on the width at the site of use where the aisles are located between the individual production lines. Usually, the access is provided on one of the lateral parts of the carriage if the aisles between the production lines are sufficiently wide so as to allow a (convenient) lateral access to a carriage parked at one of the work stations. If the aisles are too small for this, the access to the carriage is usually provided on the front or the rear side of the carriage.

The carriage is parked at the work station where a needle breakage has occurred in such a manner that one of its lateral parts faces the work station (and thus the seamstress working at the work station).

If the aisles between the production lines are sufficiently wide, access to the content of the carriage—when the carriage is parked at a work station—should be located on the lateral part facing away from the work station (the production line). Depending on the situation at the location of use, the access is arranged accordingly either on the left or the right lateral part of the carriage (relative to moving/sliding direction of the carriage). Therefore, the lateral part facing the work station and the access to the storage spaces are arranged so as to be at an angle of 180° relative to each other.

If, however, the aisles are too narrow for a lateral arrangement of the access, said access is provided on one of the face sides (i.e., on the front side or rear side) of the carriage. The lateral part of the carriage facing the work station and the access (to the storage spaces) form an angle of 90°.

Due to the fact that (in case of a needle breakage) the access to the storage spaces and the side of the carriage facing the work station are preferably arranged at an angle of 180° relative to each other (the access faces diametrically away from the work station), however at least at an angle of 90° (access is laterally facing away), it is ensured that only the person who is working with the carriage has (direct) access to the content of the carriage via the access opening. This is because the seamstress and the mechanic are either on the side of the carriage opposite the access or they are at least facing away therefrom at an angle of 90°. Consequently, any access to the content of the carriage that could result in confusion, other mistakes or theft is thus made difficult.

The access to the carriage is preferably configured so that it can be locked. For reasons of space, usually a rolling or a sliding door is installed.

The magnetic broom and, optionally, the magnetic pin are preferably provided on the side facing away from the access, so that the seamstress can reach and use it from her station.

On the work surface, in the region facing the side where the magnetic broom is located, there may be a port for work utensils in which, e.g., the unused bags for needle fragments (needle letters) are accommodated. Considering a more cost-effective option, the port may also be implemented in the for of a box, e.g., of plastic material, that is open toward the top and that is placed on the work surface. The port may comprise an identified (prespecified) area that is used for parking the container (parking area), said port being used for the verification method. As an alternative to parking the container, it is possible to provide an area of the work surface, e.g., in the form of a recess in the base of the work surface.

Now the magnetic broom/magnetic pin and the port should be (directly) reachable from the side facing the work station (i.e., by the seamstress). Consequently, only the magnetic broom and the port are generally accessible regions; the remainder of the carriage is a closed unit.

From the side of the carriage where the access is provided it should be possible to remove the container from the parking area (if it is in said parking area). If the parking area is an integral part of the port, the port should be designed in such a manner that access to the parking area from the top is possible. To do so, the port may be open toward the top or it may have an opening on the upper side. If the parking area is an integral part of the work surface (e.g., in the form of a recess), access from the top is possible in any event.

The first storage space (for new unused needles) in the carriage preferably has a size such that only an amount of at most 400 to 500 needles can be loaded. On the one hand, this acts as protection against theft (because this amount is usually not sufficient to make any theft worthwhile), maintains overview and provides easier access to the needles. In addition, improved cost control in calculating production costs is achieved because the needles removed from the main storage for the carriage directly affect the relevant proportion of the production costs.

The third storage space for broken needles contains a particularly preferred modification of the device that catches needles—should they fall out of the bags (i.e., should they detach from the storage system). In order to store the bags with the needle fragments, e.g., by gluing them to printed storage forms, the device can be implemented as a suspension folder in which the printed storage forms can be inserted. In order to simplify the recording of statistics regarding the occurrence of breakages per day, it is possible to file the bags sorted by the day when they were put into storage.

In addition to the storage spaces, the carriage may comprise three additional areas performing the following functions: (1) installation and operation of a laptop computer, (2) storage space for work means required for the method, and (3) free space that can be used for the installation of a battery, for example. The battery may be disposed for feeding light sources that are used for needle identification or for supplying an electronic alarm system that indicates, e.g., by means of lights, the production line where the carriage is required.

All the aforementioned specific features of the carriage allow the uncomplicated and requirement-specific performance of the quality assurance procedure.

Advantageous embodiments of the inventive verification method, the inventive container as well as the inventive use of the carriage can be inferred from the dependent claims and the description. The description is restricted to essential features of the invention. The drawings are to be used for supplementary information. Hereinafter, an exemplary embodiment of the inventive container, carriage and the inventive verification method are explained in detail with reference to the attached figures. They show in

DETAILED DESCRIPTION

Figure 4:
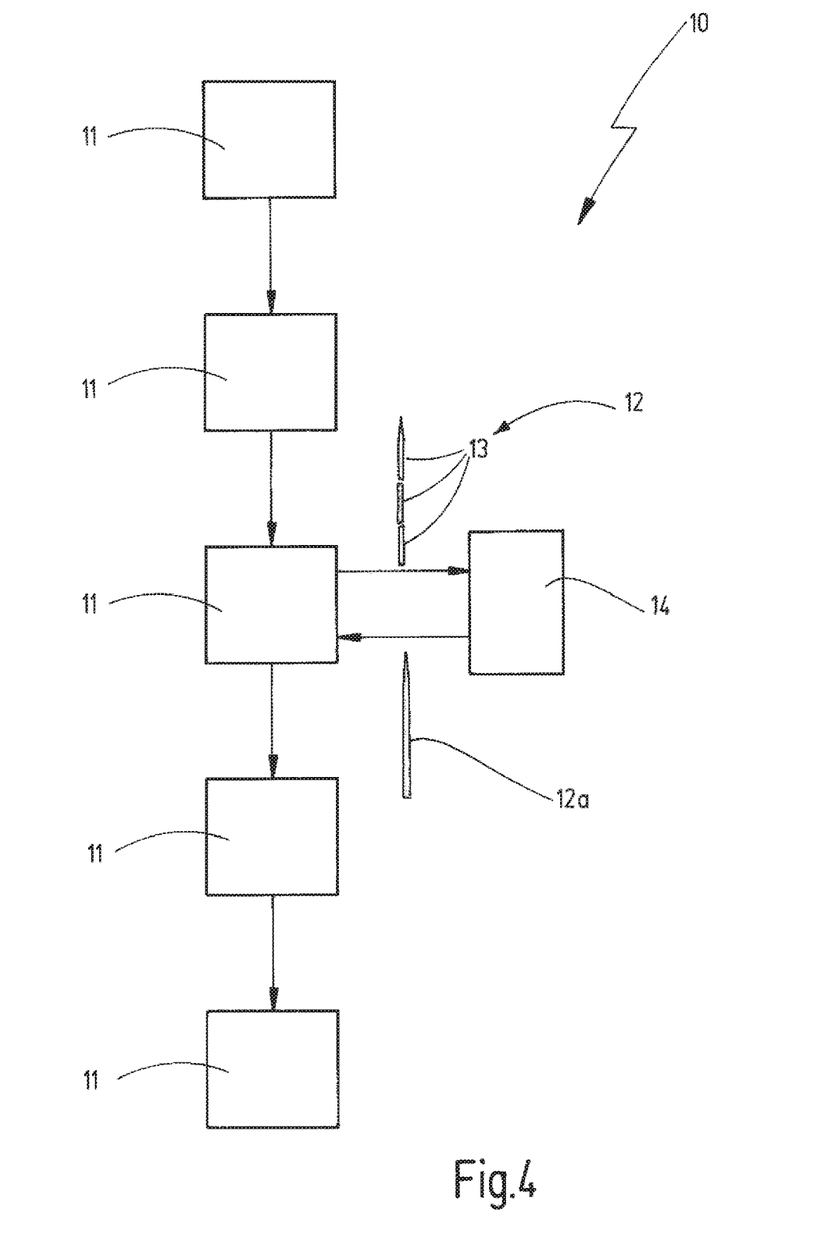
FIG. 4 a representation resembling a block circuit diagram of a quality assurance method when sewing a textile part.

FIG. 4 shows a flow-chart of a method 10 for quality assurance in sewing a textile part, for example an item of textile clothing. The textile part is produced in several work stations 11. To accomplish this, a textile workpiece is forwarded in a prespecified sequence from one work station 11 to the next work station 11. The sewing process is completed only when the textile workpiece has passed through all the work stations 11. One sewing operation on the textile workpiece takes place in each work station 11 until, finally, upon having passed all the work stations, the sewing work on the textile part has been completed.

Each work station 11 possesses a sewing machine. Furthermore, each sewing machine possesses a needle pass for the currently used sewing needle. Replacement needles do not exist at the work stations 11. It is to be ensured that in the event of wear, damage or breakage of a needle 12, a replacement needle 12a is not simply inserted and work continued. Instead, it must first be ascertained that the damaged needle and/or the fragments 13 of the broken needle 12 are removed from the work station 11 and, in particular, from the textile workpiece.

Referring to the method of the invention herein, a movable carriage 14 that can be moved between the work stations 11 is provided. In the event of a breakage of a needle 12 at a work station 11, the carriage 14 is moved from a central position between the work stations to the affected work station 11. The carriage 14 picks up the damaged needle or the fragments 13 of the damaged needle 12. After—with the use of the needle pass—the affected needle was identified and it was ensured that all fragments 13 of the broken needle 12 were removed from the work station 11, these are initially deposited in the carriage 14 in order to later bring them to a central collection site. The person working at the affected work station 11 need therefore not leave the affected work station 11. Needle replacement takes place directly at the work station 11.

The needle type to be used is prespecified for each work station 11. For example, an identification may be provided at the work station 11 by means of the needle pass described in the procedure or on the sewing machine. Therefore, in the event of a replacement of the needle in case of damage or breakage, it can be determined immediately and clearly which replacement needle 12a needs to be dispensed at the work station 11.

At least one container 20 is provided at the work station and/or in the carriage 14 for receiving the fragments 13 of the broken needle 12. Each container 20 comprises an accommodation space 21 for the fragments 13, said container being delimited by a main body 22 and a lid 23. The lid 23 can be moved between a closed position closing the accommodation space 21 and an open position that at least partially opens the accommodation space 21. Each container 20 is provided only for the accommodation of the fragments 13 of a single needle 12. After these fragments 13 have been arranged in the accommodation space 21, the lid 23 is moved into its closed position. By means of the container 20, it can be verified and ensured that fragments 13 of the needle 12 have been found and removed from the work station 11.

Figure 1:
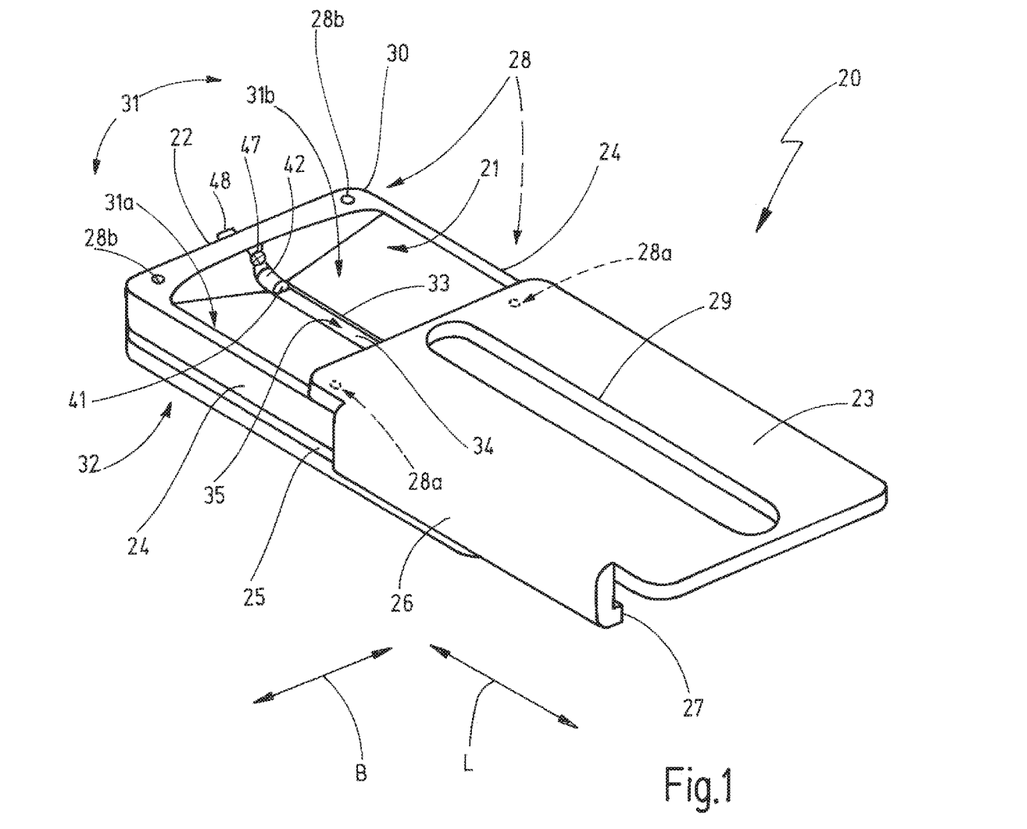
FIG. 1 a perspective representation of an exemplary embodiment of a container for storing fragments of a needle.

FIG. 1 shows a container 20 that is particularly suitable for use in accordance with the verification method. This container 20 is suitable for the accommodation of the fragments 13 of a needle 12, for example a sewing machine needle as is used in the verification method 10, however, is basically also suitable for other machine needles. Potentially, the dimensions of the container 20 will have to be adapted to the size of the needle 12.

In the exemplary embodiment, the lid 23 is supported by the main body 22. To do so, a guide groove 25 extending in longitudinal direction L is provided on each of the two opposing longitudinal sides 24 of the main body 22. Each guide groove 25 is associated with a lateral flange 26 having a guide projection of the lid 23. A guide projection 27 comes into engagement with each guide groove 25. In the exemplary embodiment, the guide groove 25 and the guide projection 27 have a rectangular cross-section.

Consequently, the lid 23 can be slid in longitudinal direction L along the main body 22 between its closed position and its open position. Alternatively, it would also be possible to pivotally move the lid 23 on hinges on the main body 22 and to move the lid 23 between the opened and closed positions by means of a pivoting motion. A holding means 28 is provided on the lid 23 and the main body 22, said holding means holding and/or securing the lid 23 on the main body 22 in its closed position. The holding means 28 may be an engagement means. Referring to the exemplary embodiment shown here, the holding means comprises at least one snap-in nub 28a on the lid 23 and/or on the main body 22 and at least one associate snap-in recess 28b on the respectively other container part. In accordance with the example, the side of the lid 23 facing the main body 22 is provided with snap-in nubs 28a, these being associated with respectively one snap-in recess 28b on the main body 22. In the closed position, the snap-in nubs 28a engage in the snap-in recesses 28b in order to hold the lid 23 in its closed position and avoid an inadvertent opening.

The lid 23 may consist in part or fully of transparent material, so that—in the closed position of the lid 23—a view into the accommodation space 21 is possible. For example, in the region of the lid 23, there is a transparent viewing window. Referring to the exemplary embodiment shown by FIG. 1, such a viewing window is configured as a magnifying lens part 29. As a result of this, it is possible to view fragments 13 of the needle 12 located in the accommodation space 21 in an enlarged manner and hence more precisely. In doing so, it is easier to decide whether two fragments 13 directly adjoin each other. To accomplish this, the fracture surfaces or breaking edges can be viewed more precisely through the magnifying lens part 29.

In a modification of the exemplary embodiment shown by FIG. 1, additional parts or the entire lid 23 may be made of transparent material, in addition to providing a magnifying lens part 29.

In the exemplary embodiment, the accommodation space 21 may be configured as a recess in the main body 22. The main body 22 has a peripheral edge 30 associated with the lid 23, in which case the lid 23—in its closed position—preferably abuts peripherally against the edge 30, thereby locking the accommodation space 21. A base surface 31 of the main body 22 faces the accommodation space 21. It has a first surface section 31a and a second surface section 31b. The two surface sections 31a, 31b are separated from each other by a groove 33 located at the base 32 and, in the exemplary embodiment, extending through the base surface 31. Starting from the groove 33, the two surface sections 31a, 31b extend upward in an inclined manner toward the section of the edge 30 extending in longitudinal direction L. A fragment 13 that is deposited on a surface section 31a, 31b of the base surface 31 slides toward the groove 33 due to the pitch of said groove.

In accordance with the example, the groove 33 extends in longitudinal direction L preferably through the entire accommodation space 21. The groove 33 is disposed for arranging a retaining magnet 34 on the main body 22. The cross-sectional form of the groove 33 is adapted to the cross-sectional form of the retaining magnet 34. Preferably, the retaining magnet 34 essentially completely fills the groove 33, at least in width direction B transversely to the longitudinal direction. An upper side 35 of the retaining magnet 34 adjoining the accommodation space 21 adjoins the two surface sections 31a, 31b of the base surface 31 of the main body 22. The transition between the surface sections 31a, 31b and the upper side may be continuous. In the exemplary embodiment, there is a small offset between the upper side 35 and the surface sections 31a, 31b. It is advantageous if the retaining magnet 34 at least does not project from the groove 33, so that the fragments 13 can roll or slide over the surface sections 31a, 31b on the upper side 35 of the retaining magnet 34.

If the lid 23 has a transparent viewing window and/or a magnifying lens part 29, said part may be located above the retaining magnet 34 when the lid 23 is closed.

Figure 3:
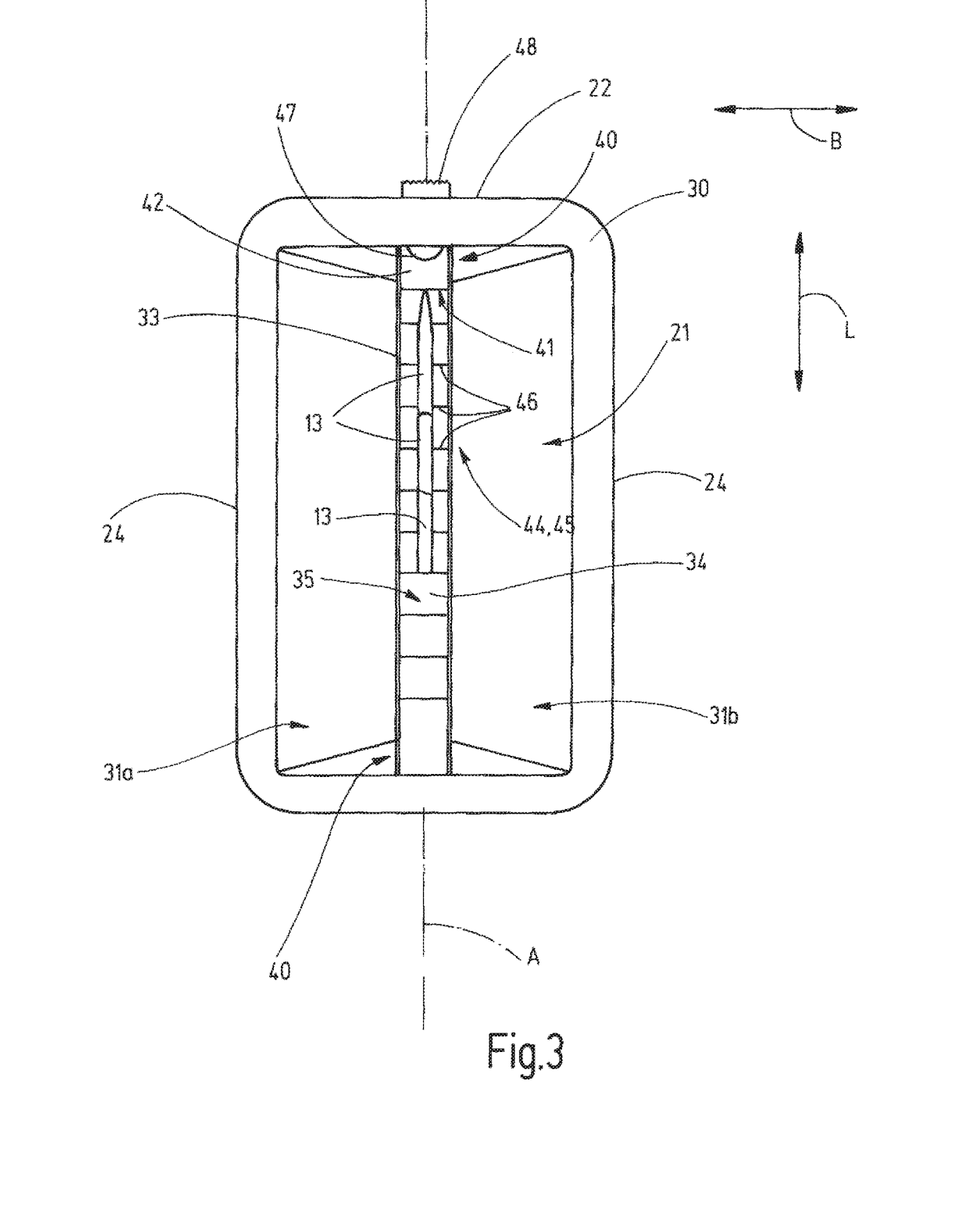
FIG. 3 the main body of the container of FIG. 1, with a view into the open accommodation space.

The retaining magnet 34 is a permanent magnet consisting of a samarium-cobalt alloy. Its magnetic field extends through at least a part of the accommodation space 21. Magnetizable fragments 13 of a needle 12 placed in the accommodation space 21 are caught by the magnetic field and attracted. The retaining magnet 34 extends along an axis A in longitudinal direction L (FIG. 3). In the region of one of the two axial ends 40 of the retaining magnet 34, there is an abutment surface 41 that—in the exemplary embodiment—extends at a right angle from the upper side 35 of the retaining magnet 34. The abutment surface 41 is provided on an abutment part 42 of the main body 22, as can be seen in FIG. 1. Basically, the form of the abutment part 42 can be selected as desired. In the exemplary embodiment shown by FIG. 1, the abutment part 42 is semi-cylindrical. The width of the abutment part 42, in width direction B measured transversely to the longitudinal direction L, corresponds to the width of the groove 33 and/or the upper side 35 of the retaining magnet 34.

As is shown by FIG. 3, a display 44 is also provided in the accommodation space 21 and, in accordance with the example, a metering scale 45 is provided with at least one and, in accordance with the example, several metering scale elements 46. In accordance with the example, the metering scale elements 46 are configured as metering scale lines. The display 44 extends in the region of the axis A in longitudinal direction L. The display comprises metering scale elements 46 that are provided at prespecified sites (in longitudinal direction L) opposite the abutment surface 41. They are disposed to allow a quick comparison of the length of the fragments 13 of a needle 12 and, in particular the total length, of all the fragments 13 located in the accommodation space 21 with the known length of the undamaged needle 12. In particular, respectively one metering scale element 46 is applied at the distance of the length of each needle 12 that is being used in the accommodation space 21.

Referring to the exemplary embodiment illustrated here, the display 44 embodied as the metering scale 45 is located directly on the upper side 35 of the retaining magnet 34. Alternatively or additionally, it is possible to provide the display 44 also on the base surface 31 adjacent the retaining magnet 34. Instead of a metering scale 45, any other display 44 may be provided in the accommodation space 21. For example, the display 44 could be a true-to-form representation of the needle, so that a comparison of the length and/or form allows the quick recognition whether all fragments 13 of the needle 12 are present.

Figure 2:
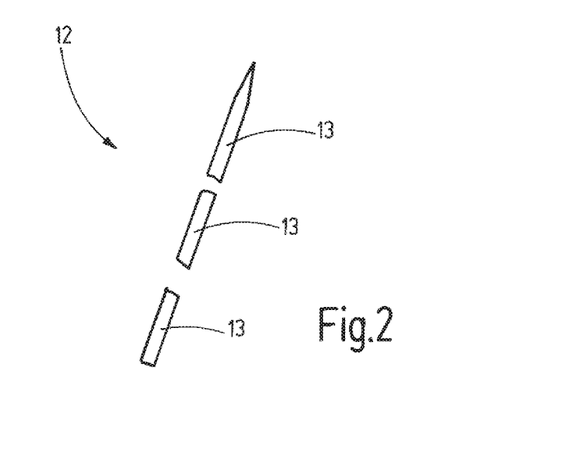
FIG. 2 the schematic representation of the fragments of a needle.

If a needle, in particular a machine sewing needle breaks, the fragments 13 of the broken needle 12 (FIG. 2) are frequently collected with the aid of a magnetic broom and/or a magnetic pin and placed in the accommodation space 21 of the container 20. Preferably, the fragments 13 are placed next to each other at the break points in a manner that corresponds to the original and unbroken needle 12. In doing so, one end of the fragment 13, for example the tip of the needle or the shaft end of the needle 12, is placed on the abutment surface 41 (FIG. 3). Additional fragments follow successively in the order as they were originally connected to each other, which can be ascertained in view of the break points and the form of the fragments. By means of the display 44, the total length and/or the form of all arranged fragments 13 can be determined. At least the total length or the form of the fragments 13 can be compared with the known total length or form of the undamaged needle 12.

Consequently, it is possible to determine very quickly whether all the fragments 13 of the broken needle 12 have been found and placed in the container 20. In this case, all the fragments 13 are placed in a bag and the bag is glued closed. After it has been sealed, the bag can no longer be opened in a non-destructive manner. In this manner, it is to be ensured that all the found needle fragments 13 are first stored on the work surface used for documentation and later leave the factory for recycling. To do so, the needle fragments 13 are simply removed from the bag, i.e., the fragments can be moved to recycling (separate from the bag). The bag that is provided in the form of a printed storage form, however, plays an essential part in the performance of the quality assurance process.

In the method that has been common so far—wherein the needle fragments 13 are glued to an adhesive film—the needle fragments 13 usually adhere to the adhesive film strongly enough that they can be separated from the adhesive film only with an unreasonably great effort. Therefore, the needle fragments are left on the adhesive film, thus making a recycling impossible or at least making it rather difficult.

The needle replacement is documented, and the bag containing the fragments is stored together with the documentation—usually for 6 months—for the event of a potential verification by the client ordering the textile workpiece. The manufacturing process may then be continued with a replacement needle 12a, because all the fragments 13 have been removed from the processed textile workpiece.

It is also possible to provide a battery-operated light source 47 in the accommodation space 21 of the container 20 in order to have sufficient light for viewing the fragments 12.

A switch 48 that is accessible with the lid 23 closed may be used for switching the light source 47 on and off. The battery for operating the light source may be arranged in the main body 22, for example. The light source 47 and the switch 48 are shown by FIGS. 1 and 3 in an exemplary and highly schematized manner. The light source 47 may be a light-emitting diode, for example. It is also possible to arrange light sources 47 at different points in the accommodation space 21.

In cases in which the fragments 13 of a broken needle 12 are not found at the work station 11, the transport of the textile workpiece to a needle detector space is necessary. In the method of the present invention a lockable container is used. This prevents fragments 13 from becoming lost during transport of the textile workpiece. The bottom of the container is preferably black in order to make possible an easier detection of fragments 13. Preferably, the container is also equipped with a magnetic broom that, among other things, is also disposed to search the interior and the bottom of the container for fragments 13. This prevents fragments 13 from remaining in the container and the textile workpiece transported back from the needle detector space to the work station 11 from potentially again being contaminated with a fragment 13.

Figure 5:
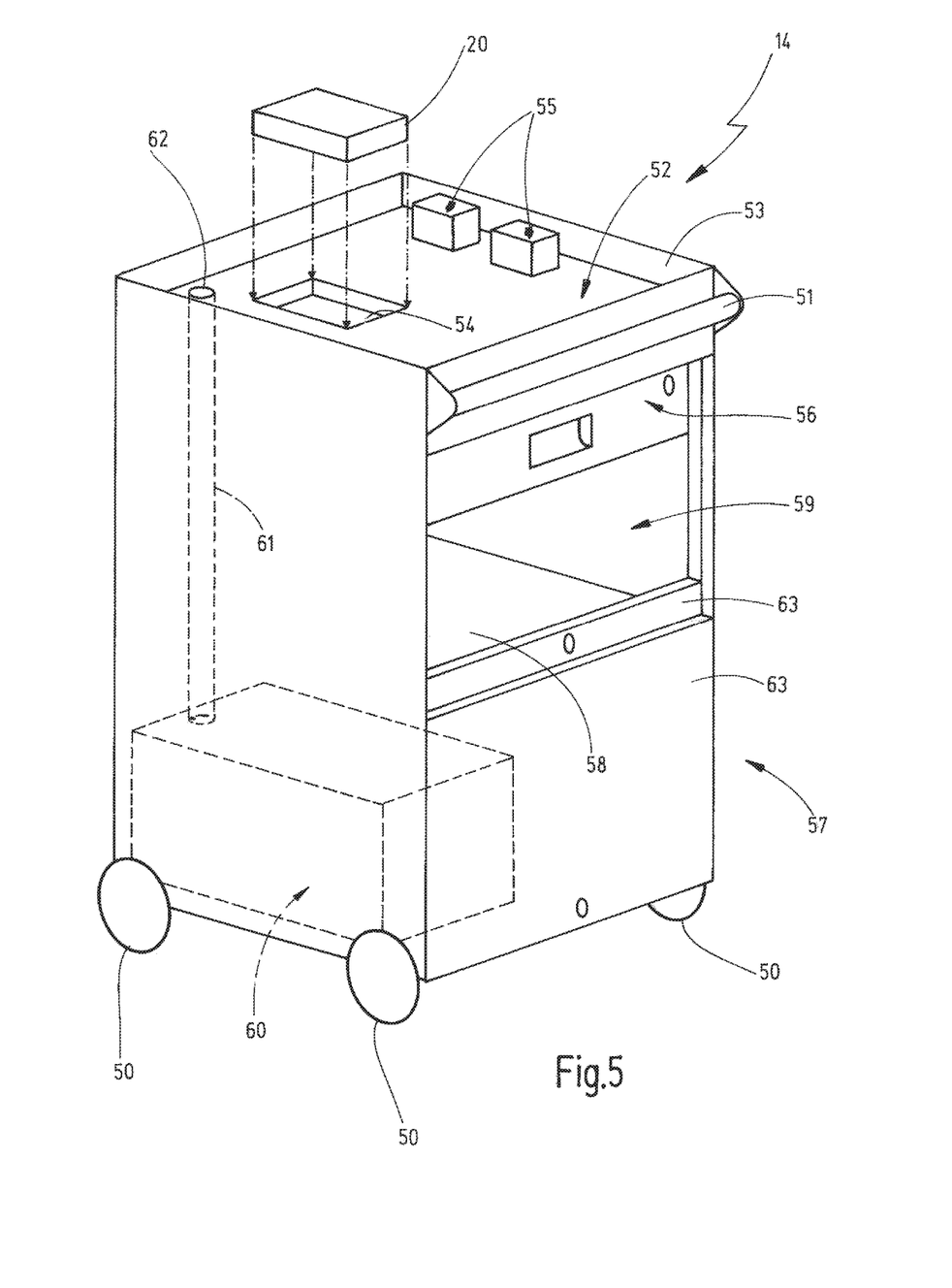
FIG. 5 a schematic perspective view of an exemplary embodiment of a carriage for the replacement of needles at a sewing work station.

FIG. 5 is a schematic perspective representation of the carriage 14. In the region of its base, the carriage 14 comprises rollers 50 that are immovable and/or pivotable about a vertical axis. The carriage 14 can be pushed with the use of these rollers 50. In the exemplary embodiment, this is a manually movable carriage 14. On its upper side, this carriage has a handle 51 for pushing. The upper side of the carriage 14 has a work surface 52 or represents such a work surface 52. The work surface 52 is dark and preferably black in order to be able to better detect the fine, silvery light-colored fragments 13 of needles 12. In the exemplary embodiment, the work surface 52 is enclosed by a peripheral edge 53 so that no fragments 13 or needles 12 can inadvertently drop down from the work surface 52.

In the area of the work surface 52 of the carriage 14 in the illustrated exemplary embodiment, there is also a recess 54 that is disposed for at least partially accommodating a container 20. By means of the recess 54, the container 20 can be secured against shifting on the work surface 52, as it were. Instead of the recess 54, other means such as projections or the like, may also be used for arranging the container 20 on the work surface 52.

Furthermore, additional receptacles 55 that, for example, contain sealable bags may be present on the work surface 52, in which bags fragments can be collected and documentation relating to the needle replacement can be stored. Furthermore, there may be a receptacle 55 for collecting debris. For example, the bags may have a self-adhesive fold that is covered by a foil or a strip. After exposing this self-adhesive fold before sealing the bag, the foil or the strip remain and can be thrown into the appropriate receptacle 55.

Furthermore, the interior of the carriage 14 contains a drawer 56 that is accessible from the front side 57 of the carriage 14. Thus, the carriage 14 is particularly suitable for use in facilities where the aisles between the production lines made up of the work stations 11 are relatively narrow, i.e., for uses where a 90° angle is recommended between the access to the content of the carriage and the lateral parts of the carriage. Alternatively, the access to the content of the carriage 14 may either be in the left or right lateral part of the carriage 14 if the carriage 14 is intended for use in facilities where the aisles between the production lines are relative wide, i.e., depending on the positioning of the carriage between the work stations 11. The drawer 56 contains unused, new needles 12, i.e., replacement sewing needles 12a. In doing so, the drawer 56 represents a first storage space of the carriage 14, in accordance with the example. Preferably, the drawer 56 can be locked. As a result of this, any access to the replacement sewing needles 12a by unauthorized persons can be avoided and a complete documentation regarding each needle replacement can be ensured.

The interior of the carriage 14 is divided by an intermediate base 58. In an upper region 59, above the intermediate base 58 and the interior space, there can be arranged additional objects, for example, a writing support or a clip board, writing utensils or the like. Furthermore, this upper region 59 is disposed for storing fragments 13 held in sealed bags and for documentation regarding needle replacement. This region 59 forms a third storage space of the carriage 14. Below the intermediate base 58, there is, for example, the second storage space of the carriage 14, in particular, for a storage container 60 for used, worn or damaged, however not broken, needles. This storage container 60 is connected to the work surface 52 by means of a shaft or duct, for example, a tube 61. At that location, there is an orifice 62 of the shaft or tube 61. Used, damaged or not broken needles can be thrown through the orifice 62 on the work surface 52 through the tube 61 into the storage container 60.

On the front side 57 of the carriage 14, there is at least one door for locking the interior of the carriage 14. Referring to the exemplary embodiment, there are two sliding doors 63 that are offset relative to each other. In accordance with the example, the sliding doors 63 are arranged so as to be slidable behind each other in vertical direction. Depending on the position of the two sliding doors 63, either the upper region 59 of the interior space above the intermediate base 58 or the region below with the storage container 60 for the used, however not broken, needles is accessible. As a result of this, it is ensured that either new needles can be removed from the drawer 56 or used needles can be removed from the receiving space 60 for recycling. A simultaneous access to the drawer 56 and the storage container 60 is avoided by the two sliding doors 63. This has the advantage that an inadvertent confusion of new and used, unbroken needles is not possible.

For replacement of a broken needle with a replacement sewing needle 12a it is first determined with the aid of the needle pass what type of needle is concerned and, subsequently, it is verified with the use of the container 20 and, in particular, the display 44 provided therein, whether all fragments 13 are present. If this is the case, a bag is removed from a receptacle 55 and the fragments 13 are arranged therein. Subsequently, the bag is sealed via a self-adhesive fold and can no longer be opened in a non-destructive manner. For documentation purposes, this bag is glued to a documentation sheet and stowed in the upper region 59. Subsequently, a replacement needle 12a can be removed from the drawer 56 and transferred to the work station 11. If a needle 12 is not broken but simply worn and still in one piece, it is thrown via the orifice 62 into the storage container 60, and then a new sewing needle is removed from the drawer 56 and transferred as the replacement sewing needle 12a to the work station 11. Therefore, broken or damaged and not broken or new needles can be strictly separated from each other by means of the carriage 14.

Furthermore, a magnetic broom may be provided, which allows the fragments to be collected from the floor and/or a magnetic pin may be provided for finding and removing fragments 13 from the work station or the textile workpiece.

The invention relates to a verification method 10 that is disposed for quality assurance when sewing a textile part.

Sewing takes place sequentially at several work stations 11. A carriage 14 that can be moved between the work stations 11 is provided. If a needle 12 breaks off in a work station 11, the carriage 14 is moved to this work station 11. The fragments 13 of the needle 12 are arranged in a container 20, and the container is transferred to the carriage 14. If it has been determined that all the fragments 13 were removed from the work station 11, a replacement sewing needle 12a is removed from the carriage 14 and made available for this work station. Furthermore, the invention relates to a container 20 for receiving the fragments 13 of the needle 12. The container 20 has an accommodation space 21 that is delimited by a main body 22 and a lid 23. In the region of a base 32 of the main body 22, there is arranged a retaining magnet 34 extending along an axis A. Magnetizable fragments 13 of a needle 12 are held by said magnet's magnetic field in the region of the axis A in the accommodation space 21.

Figure 6:
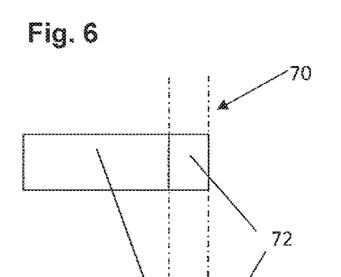
FIG. 6 a plan view of a needle letter.
Figure 7:
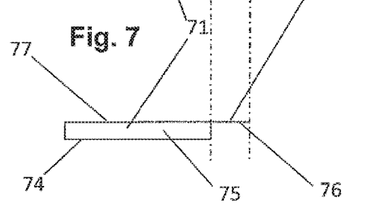
FIG. 7 a lateral view of a needle letter.

FIGS. 6 and 7 show needle letters 70 having a main section 71 and a tab section 72, both being components of the same rectangular section of a transparent plastic foil. On one surface/side of the needle letter 70 there is an attachment foil 74 that is continuously welded to the main section 71 except for the side facing the tab section 72, and the first adhesive section 76 that is arranged on the tab section 72. The main section 71 and the attachment foil 74 form a bag 75 that is open on the side facing the tab section 72. The bag 75 can be sealed with the tab section 72 with the use of the first adhesive section 76. On the reverse side of at least the main section there is a second adhesive area 77 that is intended for gluing the needle letter 77 to a sheet, preferably the documentation sheet 78 mentioned hereinafter.

Figure 8:
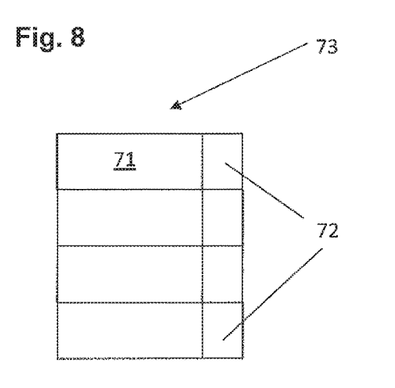
FIG. 8 a detail of a needle letter sheet.

FIG. 8 shows a detail of a needle letter sheet 73 that comprises or consists of several needle letters 70.

Figure 9:
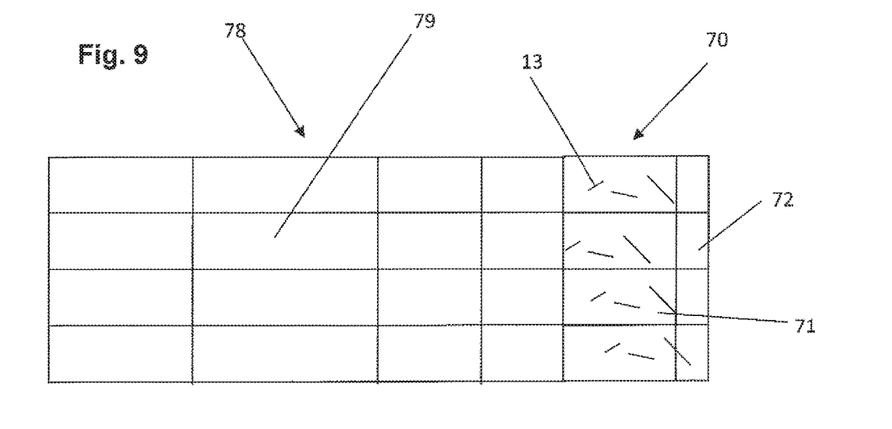
FIG. 9 a detail of a documentation sheet with needle letters glued to said sheet.

FIG. 9 shows a documentation sheet 77 to which several needle letters 70 are glued and in which information such as the date, the time, the affected work station (machine), the production line, the person working at the work station (operator) and the part number of the broken needle can be entered in the information fields 79 provided therefor.

LIST OF REFERENCE SIGNS

10 Verification method
11 Work station
12 Needle
12a Replacement sewing needle
13 Fragment
14 Carriage
20 Container
21 Accommodation space
22 Main body
23 Lid
24 Longitudinal side of the main body
25 Guide groove
26 Lateral flange
27 Guide projection
28 Holding means
28a Snap-in nub
28b Snap-in recess
29 Magnifying lens part
30 Edge on the main body
31 Base surface
31a First surface section
31b Second surface section
32 Base of the main body
33 Groove
34 Retaining magnet
Upper side
40 Axial end of the retaining magnet
41 Abutment surface
42 Abutment part
44 Display
45 Metering scale
46 Metering scale element
47 Light source
48 Switch
50 Roller
51 Handle
52 Work surface
53 Edge
54 Recess
55 Receptacle
56 Drawer
57 Front side
58 Intermediate base
59 Upper region
60 Storage container
61 Tube
62 Orifice
70 Needle letter
71 Main section
72 Tab section
73 Needle letter sheet
74 Attachment foil
75 Bag
76 First adhesive section
77 Second adhesive section
78 Documentation sheet
79 Information field
A Axis
B Width direction
Longitudinal direction

The invention claimed is:

1. Method for verifying whether all fragments (13) of a broken needle (12) are present, the method comprising receiving fragments (13) of the broken needle in an accommodation space (21) of a container (20), said accommodation space being delimited by a base body (22) and a lid (23) of the container (20), wherein the fragments (13) of the broken needle (12) are arranged in an aligned manner such that an original shape of the broken needle prior to breaking is substantially reproduced using a retaining magnet (34) in the accommodation space (21).

2. Method as in claim 1, further comprises verifying whether all the fragments (13) of the broken needle (12) are present in the container (20), and that, only after it has been confirmed that an exchanged needle is complete and no fragments remain in a work station in which the broken needle was inserted or in a workpiece that has been processed, a replacement sewing needle (12a) is released for the work station (11).

3. Method as in claim 1 further comprising receiving only the fragments (13) of a single needle (12) in each container (20).

4. Container (20) for receiving fragments of a broken needle, the container comprising:
- a main body (22) and a lid (23) that delimit an accommodation space (21), wherein the main body (22) has a length and width and defines a groove (33) between base surface sections (31a, 31b) of the main body, the groove (33) having an elongated shape oriented along the length of the main body and configured to receive the fragments (13) of a broken needle (12),
- a retaining magnet (34) mounted to the main body (22) and configured to provide a magnetic field adapted to retain the fragments of the broken needle (12) within the groove (33) to provide an aligned arrangement of the fragments (13) of the broken needle (12) within the groove (33) such that an original shape of the broken needle prior to breaking is substantially reproduced, such that it can be determined whether all the fragments (13) of the broken needle (12) are present in the container (20),
- a display (44) provided in the accommodation space (21) proximate to the retaining magnet (34), the display configured and disposed to verify whether all the fragments (13) are in the container.

5. Container as in claim 4, wherein the retaining magnet has a strength such that needle fragments arranged on the retaining magnet are held securely on the retaining magnet even if the container falls from a height of a maximum of 1.50 m, and
wherein at least a surface of the retaining magnet intended for an aligned arrangement of the needle fragments is of a quality that, between the fragments arranged on the retaining magnet and the retaining magnet, there is an adhesive friction that is so minimal that the affected fragments can be shifted on the surface, without detaching from the retaining magnet.

6. Container as in claim 4, wherein the retaining magnet (34) extends along an axis (A) on a base (32) of the main body (22).

7. Container as in claim 6 wherein along the axis (A), there is an abutment surface (41) in at least one location (40).

8. Container as in claim 7 wherein the display (44) directly adjoins the abutment surface (41) in the direction of the axis (A).

9. Container as in claim 4, wherein the retaining magnet (34) is arranged in the groove (33) of the main body (22), said groove being open on a side facing the accommodation space (21).

10. Container as in claim 4, wherein the display (44) is one or both of a metering scale (45) or a graphic depiction of the needle (12).

11. Container as in claim 4, wherein the display (44) is arranged on one or both of an upper side (35) of the retaining magnet (34) facing the accommodation space (21) or on a base surface (31) of the main body (22) facing the accommodation space (21).

12. Container as in claim 4, wherein the lid (23) includes at least in part a transparent material, in which case the lid has a magnifying lens part (29) in a region above the retaining magnet (34).

13. An apparatus for use for the replacement of damaged or broken needles (12) with a replacement sewing needle (12a) at a work station (11) where a sewing operation is performed on a textile workpiece, the apparatus comprising:
- a carriage (14) comprising an interior space with a first storage space (56) for replacement sewing needles (12a), a second storage space (60) for used, unbroken needles (12), and a third storage space (59) for the fragments (13) of a broken needle (12), wherein all the storage spaces (56, 59, 60) are separate from each other;
- a container (20) for receiving fragments of a broken needle, the container comprising:
  - a main body (22) and a lid (23) that delimit an accommodation space (21), wherein the main body (22) has a length and width and defines a groove (33) between base surface sections (31a, 31b) of the main body, the groove (33) having an elongated shape oriented along the length of the main body and configured to receive the fragments (13) of a broken needle (12),
  - a retaining magnet (34) mounted to the main body (22) and configured to provide a magnetic field adapted to retain the fragments of the broken needle (12) within the groove (33) to provide an aligned arrangement of the fragments (13) of the broken needle (12) within the groove (33) such that an original shape of the broken needle prior to breaking is substantially reproduced, such that it can be determined whether all the fragments (13) of the broken needle (12) are present in the container (20),
  - a display (44) provided in the accommodation space (21) proximate to the retaining magnet (34), the display configured and disposed to verify whether all the fragments (13) are in the container.

14. The apparatus of claim 13, wherein the carriage comprises a switching device that prevents a simultaneous access to the first storage space (56) and the second storage space (60).

* * * * *